UNITED STATES PATENT OFFICE.

ALBRECHT SCHMIDT, OF HÖCHST-ON-THE-MAIN, GERMANY, ASSIGNOR TO FARB-WERKE VORM. MEISTER LUCIUS & BRÜNING, OF HÖCHST-ON-THE-MAIN, GERMANY, A CORPORATION OF GERMANY.

PREPARATIONS FROM QUINONE VAT DYESTUFFS.

1,175,997.        Specification of Letters Patent.        Patented Mar. 21, 1916.

No Drawing.        Application filed September 2, 1914. Serial No. 859,795.

*To all whom it may concern:*

Be it known that I, ALBRECHT SCHMIDT, Ph. D., chemist, a citizen of the Empire of Germany, residing at Höchst-on-the-Main, Germany, have invented certain new and useful Improvements in Preparations from Quinone Vat Dyestuffs, of which the following is a specification.

The quinone vat-dyestuffs obtainable by condensing bezo-quinone or α-naphthoquinone or their homologues or substitution products with aromatic amins, as well as those obtainable, according to U. S. Patent No. 1,128,368, dated February 16, 1915, by introducing sulfur into the said dyestuffs— all these dyestuffs being comprised in the following specification under the term "quinone vat-dyestuffs"—are extensively used, particularly for wool-dyeing, either alone or in combination with other vat-dyestuffs. However, these dyestuffs very often have the disadvantage, which could not hitherto be remedied, that they are produced in a coarsely sub-divided form, and in many cases it is not advantageous, or it is even impossible to transform them into more finely sub-divided dyestuffs by a subsequent treatment. This feature of the dyestuffs, which is variable, constitutes a great drawback, particularly when they are used for dyeing wool, because a coarsely sub-divided dyestuff requires a larger proportion of caustic alkali for its reduction and for setting the dye vat, than a more finely sub-divided dyestuff requires. It is therefore very difficult for the dyer always to keep the vat at the same degree of alkalinity if he uses dyestuffs taken from different consignments, and sufficiently to preserve the wool material from deterioration by the action of the alkali. Attempts to convert these dyestuffs into commercial leuco products, such as are prepared from indigo, have failed, the alkali metal salts of the corresponding leuco compounds being soluble with too great difficulty.

By my present invention the leuco-alkali metal salts from the quinone vat-dyestuffs, with the exception of the anthraquinone-vat dyestuffs, are rendered extremely soluble by adding certain suitable bodies, for instance the so-called "monopole" soap, alkaline sulforicinoleates or their derivatives such as the so-called "turcone oil", or glycerin. Thus it is possible to obtain from the quinone vat-dyestuffs very valuable commercial solutions. This fact is all the more surprising as the aforesaid bodies do not have the same action upon the vat-dyestuffs derived from anthraquinone for instance dihydroanthraquinone-azin, known in the trade under the name "indanthrene".

As compared with the commercial quinone dyestuff-pastes hitherto used which, in most cases, contain the dyestuff in a very coarse form, reducible with difficulty, and are therefore liable to settle easily, the new vat-solutions from the quinone vat-dyestuffs have the advantage that they may be added directly to the dye-vat without the previous preparation of a stock vat; they may be used either alone or in combination with the commercial reduced indigo solution, or with solutions of leuco compounds prepared from other dyestuffs.

The terms "monopole soap" and "turcone oil" are the trade names for certain substances obtained from highly sulfonated ricinoleic acid; that is to say, "monopole soap" constitutes a sodium salt of sulfonated ricinoleic acid, as described in German Patent No. 113,433, whereas "turcone oil" is an aqueous solution of an alkali salt of sulfonated ricinoleic acid, containing about 56 per cent. of fatty matters.

The following examples illustrate my invention:

Example I: 2 kilos of a paste (20 per cent. strength) of the dyestuff obtained from one molecular proportion of bezo-quinone and two molecular proportions of para-chloranilin, are heated to 60° C. in a closed vessel with 600 grams of caustic soda lye of 40° Bé. specific gravity, 400 grams of turcone oil, 780 grams of water and 220 grams of hydrosulfite powder. The dyestuff paste thus obtained is soon reduced to a limpid, brownish-black vat-solution of 10 per cent. strength. This vat may be directly diluted by adding water so as to give the dye-vat; if required, a small proportion of hydrosulfite and ammonia may be added to the bath.

Example II: 25 kilos of a paste (10 per cent. strength) of the dyestuff referred to in Example I, 11 kilos of a hydrosulfite solution of 12 per cent. strength and 1.4 kilos of caustic soda lye of 40° Bé. specific gravity are heated for one hour to 80° C. After cooling, the mass is slightly acidified with diluted sulfuric acid, the leuco product formed is filtered and a vat solution of 10 per cent. strength, containing 2.5 kilos of turcone oil and 6.5 kilos of caustic soda lye of 40° Bé. specific gravity, prepared therefrom.

Example III: 1 kilo of a paste (28 per cent. strength) of the dyestuff obtained, as described in U. S. patent application Ser. No. 754,141, by condensing chloranil with two molecular proportions of anilin and subsequently treating with sodium sulfid, is heated for half an hour to 60° C. with exclusion of air, together with 480 grams of caustic soda lye of 40° Bé. specific gravity, 125 grams of monopole soap, 195 grams of hydrosulfite powder and one liter of water; the dyestuff is thus reduced so as to give a limpid reddish-brown vat of 10 per cent. strength.

These compositions can be distributed to the trade both in the dilute form produced according to the examples, and in a concentrated form.

By the expression "higher fatty acid base" in the claims, is intended fatty acids, their derivatives, or their salts.

Having now described my invention, what I claim is:

1. As new compositions of matter, the preparations which contain alkali metal salts of the leuco compounds from quinone vat-dyestuffs mixed with bodies suitable for dissolving these leuco compounds, and which are bodies having a higher fatty acid base, said preparations being readily soluble in water and otherwise showing the behavior corresponding to the well-known properties of the alkali salts of the leuco compounds contained therein.

2. As new compositions of matter, the preparations containing alkali metal salts of the leuco compounds from quinone vat-dyestuffs mixed with an aqueous solution of an alkali salt of sulfonated ricinoleic acid and showing a behavior corresponding to the well known properties of the alkali salts from the leuco compounds contained therein, but being readily soluble in water.

In testimony whereof I affix my signature in presence of two witnesses.

ALBRECHT SCHMIDT.

Witnesses:
 JEAN GRUND,
 CARL GRUND.